(12) United States Patent
Jamadagni et al.

(10) Patent No.: US 11,706,680 B2
(45) Date of Patent: *Jul. 18, 2023

(54) METHOD AND SYSTEM OF MANAGING VOICE CALL AND IP MEDIA SESSIONS IN A WIRELESS NETWORK ENVIRONMENT

(71) Applicant: Samsung Electronics Co., Ltd., Gyeonggi-do (KR)

(72) Inventors: Satish Nanjunda Swamy Jamadagni, Bangalore (IN); Pradeep Krishnamurthy Hirisave, Bangalore (IN); Sarvesha Anegundi Ganapathi, Bangalore (IN)

(73) Assignee: Samsung Electronics Co., Ltd

( * ) Notice: Subject to any disclaimer, the term of this patent is extended or adjusted under 35 U.S.C. 154(b) by 220 days.

This patent is subject to a terminal disclaimer.

(21) Appl. No.: 17/101,469

(22) Filed: Nov. 23, 2020

(65) Prior Publication Data

US 2021/0076285 A1   Mar. 11, 2021

Related U.S. Application Data

(63) Continuation of application No. 16/725,404, filed on Dec. 23, 2019, now Pat. No. 10,849,038, which is a
(Continued)

(30) Foreign Application Priority Data

May 13, 2010   (IN) .......................... 1361/CHE/2010

(51) Int. Cl.
*H04W 36/18* (2009.01)
*H04W 76/20* (2018.01)
(Continued)

(52) U.S. Cl.
CPC ......... *H04W 36/18* (2013.01); *H04L 65/4015* (2013.01); *H04W 60/00* (2013.01);
(Continued)

(58) Field of Classification Search
CPC ... H04W 36/18; H04W 60/00; H04W 60/005; H04W 76/20; H04W 84/12; H04W 76/16;
(Continued)

(56) References Cited

U.S. PATENT DOCUMENTS

2002/0086670 A1   7/2002   Rajanlemi
2003/0169725 A1   9/2003   Ahmavaara
(Continued)

FOREIGN PATENT DOCUMENTS

KR   1020050036038   4/2005
KR   1020080096795   11/2008
WO   WO 03/054721   7/2003

OTHER PUBLICATIONS

PCT/ISA/237 Written Opinion issued on PCT/KR2011/003572 dated Feb. 6, 2012 (pp. 3).
(Continued)

*Primary Examiner* — Christopher M Brandt
(74) *Attorney, Agent, or Firm* — The Farrell Law Firm, P.C.

(57) ABSTRACT

A network entity and an operating method thereof in a communication system are provided. The method includes establishing a first connection with a user equipment (UE) using a first access technology; receiving, from the UE, via the first connection, capability information on communication with a second cell using a second access technology different from the first access technology; transmitting a first signal to the UE via the first connection; and transmitting, to the UE, via the first connection, configuration information related to the second cell for establishing a second connec-
(Continued)

tion between the UE and the second cell. The first cell and the second cell are simultaneously active for the UE.

12 Claims, 3 Drawing Sheets

Related U.S. Application Data continuation of application No. 16/199,772, filed on Nov. 26, 2018, now Pat. No. 10,517,028, which is a continuation of application No. 15/018,084, filed on Feb. 8, 2016, now Pat. No. 10,142,902, which is a continuation of application No. 13/697,676, filed as application No. PCT/KR2011/003572 on May 13, 2011, now Pat. No. 9,258,840.

(51) Int. Cl.
| | |
|---|---|
| *H04W 60/00* | (2009.01) |
| *H04L 65/401* | (2022.01) |
| *H04W 84/12* | (2009.01) |
| *H04W 76/16* | (2018.01) |
| *H04W 84/04* | (2009.01) |
| *H04W 88/06* | (2009.01) |

(52) U.S. Cl.
CPC ......... *H04W 60/005* (2013.01); *H04W 76/20* (2018.02); *H04W 84/12* (2013.01); *H04W 76/16* (2018.02); *H04W 84/042* (2013.01); *H04W 88/06* (2013.01)

(58) Field of Classification Search
CPC H04W 84/042; H04W 88/06; H04L 65/4015; H04L 65/1069; H04L 65/1073; H04L 65/1016; H04L 65/65; H04L 12/66; H04L 9/40
See application file for complete search history.

(56) References Cited

U.S. PATENT DOCUMENTS

| | | |
|---|---|---|
| 2004/0203780 A1 | 10/2004 | Juika |
| 2005/0003819 A1 | 1/2005 | Wu |
| 2005/0198096 A1 | 9/2005 | Shaffer et al. |
| 2006/0246906 A1 | 11/2006 | Valttinen |
| 2006/0256752 A1 | 11/2006 | Svensson |
| 2007/0037603 A1* | 2/2007 | Dravida ................ H04W 76/15 455/552.1 |
| 2007/0081497 A1 | 4/2007 | Drevon |
| 2007/0237126 A1 | 10/2007 | Pirila |
| 2007/0237261 A1 | 10/2007 | Undoff |
| 2008/0026755 A1 | 1/2008 | Venkataraman |
| 2008/0064385 A1 | 3/2008 | den Hartog |
| 2008/0182615 A1 | 7/2008 | Xue |
| 2008/0317065 A1 | 12/2008 | Chen et al. |
| 2009/0103455 A1 | 4/2009 | Balasubramanian |
| 2009/0325570 A1 | 12/2009 | Rensin et al. |
| 2010/0110988 A1* | 5/2010 | Marinier ............... H04L 5/0044 370/328 |
| 2010/0172323 A1 | 7/2010 | Rexhepi |
| 2010/0189072 A1 | 7/2010 | Vikberg |
| 2011/0151874 A1 | 6/2011 | Olsson |
| 2011/0255412 A1 | 10/2011 | Ngai |
| 2011/0268083 A1 | 11/2011 | Ostrup |

OTHER PUBLICATIONS

PCT/ISA/210 Search Report issued on PCT/KR2011/003572 dated Feb. 6, 2012 (pp. 3).
Korean Office Action dated Oct. 10, 2017 issued in counterpart application No. 10-2012-7029736, 7 pages.
3rd Generation Partnership Project; Technical Specification Group GSM/EDGE Radio Access Network; Generic Access Network (GAN); Stage 2 (Release 9), GPP TS 43.318 V9.0.0, Dec. 9, 2009, 126 pages.
European Search Report dated Jun. 28, 2017 issued in counterpart application No. 11780852.7-1870, 10 pages.
3GPP, 3rd Generation Partnership Project; Technical Specification Group Services and System Aspects; IP Flow Mobility and Seamless WLAN Offload; Stage 2 (Release 10), 3GPP TS 23.261 V1.0.0, Mar. 2010, 20 pages.
3GPP, 3rd Generation Partnership Project; Technical Specification Group Services and System Aspects; Architecture Enhancements for Non-3GPP Accesses (Release 9), 3GPP TS 23.402 V9.4.0, Mar. 2010, 198 pages.
3GPP, 3rd Generation Partnership Project; Technical Specification Group Services and System Aspects; Multi Access PDN Connectivity and IP Flow Mobility (Release 9), 3GPP TR 23.861 V1.3.0, Sep. 2009, 48 pages.
European Search Report dated Oct. 1, 2019 issued in counterpart application No. 19185562.6-1218, 8 pages.

* cited by examiner

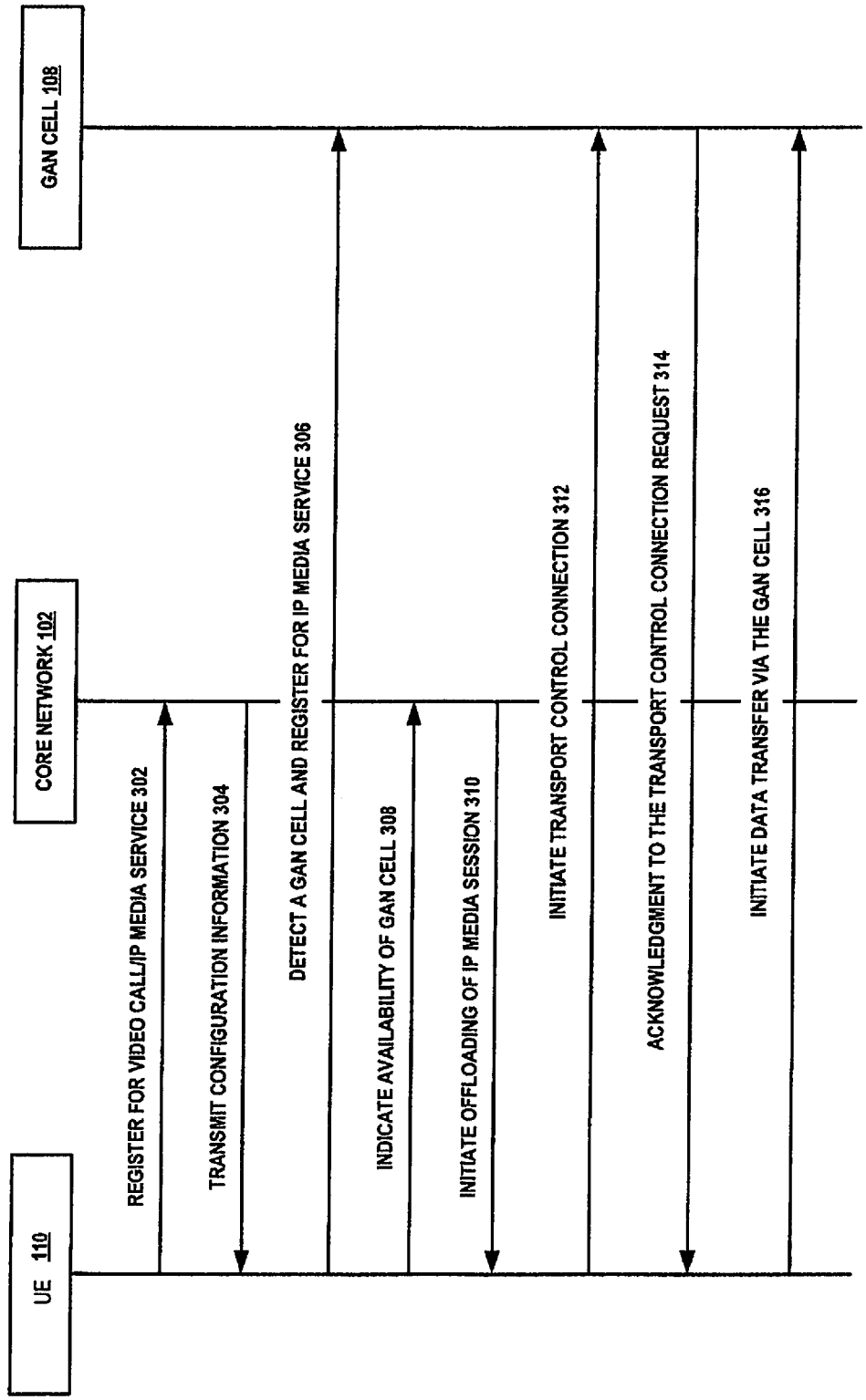

METHOD AND SYSTEM OF MANAGING VOICE CALL AND IP MEDIA SESSIONS IN A WIRELESS NETWORK ENVIRONMENT

PRIORITY

This application is a Continuation Application of U.S. patent application Ser. No. 16/725,404, filed in the U.S. Patent and Trademark Office (USPTO) on Dec. 23, 2019, which is a Continuation Application of U.S. patent application Ser. No. 16/199,772, filed in the USPTO on Nov. 26, 2018, and issued as U.S. Pat. No. 10,517,028 on Dec. 24, 2019, which is a Continuation Application of U.S. patent application Ser. No. 15/018,084, filed in the USPTO on Feb. 8, 2016, and issued as U.S. Pat. No. 10,142,902 on Nov. 27, 2018, which is a Continuation Application of U.S. patent application Ser. No. 13/697,676, filed in the USPTO on Nov. 13, 2012, and issued as U.S. Pat. No. 9,258,840 on Feb. 9, 2016, which is a National Phase Entry of PCT International Application No. PCT/KR2011/003572, which was filed on May 13, 2011, and claims priority to Indian Patent Application Serial No. 1361/CHE/2010, which was filed in the Indian Intellectual Property Office on May 13, 2010, the entire content of each of which is incorporated herein by reference.

BACKGROUND OF THE INVENTION

1. Field of the Invention

The present invention relates generally to wireless communication, and more particularly, to handling voice calls and Internet Protocol (IP) media sessions in a wireless network environment.

2. Description of the Related Art

Generic Access Network (GAN) is a telecommunication system that extends mobile voice, data, and IP Multimedia Subsystem/Session Initiation Protocol (IMS/SIP) applications over IP networks. In GAN, a User Equipment (UE), upon detecting a wireless Local Area Network (LAN) (e.g., a GAN cell), establishes a secure IP connection through a gateway to a server called a GAN controller on the cellular network. On the cellular network, the UE communicates over the air with the base station to servers in the core network of the carrier. An advantageous feature of a GAN system is the ability of the UE to migrate from the IP to cellular coverage. Thus, when the UE moves from a Global System for Mobile Communications (GSM) network to an 802.11 network, it appears to the UE as if the UE is communicating with a different base station.

Today, with operators hosting multiple services and other services being hosted by third parties on the Internet, operators prefer to selectively handover certain IP media sessions to the GAN cell when available.

However, the GAN system does not support simultaneous access across different Radio Access Technologies (RATs) like GSM Enhanced Data Rates for GSM Evolution (EDGE) Radio Access Network (GERAN) and GAN. So, when a GAN cell is detected, the UE attaches to the GAN cell and voice and IP media sessions of the UE are transferred to the GAN. Currently, there is no method for selectively offloading IP media data streams to the GAN while maintaining an ongoing voice call (e.g., circuit switched network calls) on the existing GERAN/Universal Terrestrial Radio Access Network (UTRAN).

SUMMARY OF THE INVENTION

Accordingly, the present invention has been designed to address the above and other problems occurring in the prior art, and provide at least the advantages described below. Accordingly, an aspect of the present invention provides a method and system for managing voice call and IP media sessions in a wireless communication environment.

According to an aspect of the present invention, a method is provided for a network entity of a first cell in a communication system. The method includes establishing a first connection with a user equipment (UE) using a first access technology; receiving, from the UE, via the first connection, capability information on communication with a second cell using a second access technology different from the first access technology; transmitting a first signal to the UE via the first connection; and transmitting, to the UE, via the first connection, configuration information related to the second cell for establishing a second connection between the UE and the second cell. The first cell and the second cell are simultaneously active for the UE.

According to another aspect of the present invention, a network entity is provided for a first cell in a communication system. The network entity includes a memory; and at least one processor coupled to the memory. The at least one processor is configured to establish a first connection with a user equipment (UE) using a first access technology, receive, from the UE, via the first connection, capability information on communication with a second cell using a second access technology different from the first access technology, transmit, to the UE, via the first connection, a first signal, and transmit, to the UE, via the first connection, configuration information related to the second cell for establishing a second connection between the UE and the second cell. The first cell and the second cell are simultaneously active for the UE.

BRIEF DESCRIPTION OF THE DRAWINGS

The above and other objects, features and advantages of the present invention will be more apparent from the following detailed description taken in conjunction with the accompanying drawings, in which:

FIG. 3 is a flow diagram illustrating a method of indicating decision to selectively offload IP media session to a GAN cell, according to an embodiment of the present invention.

Figure 1:
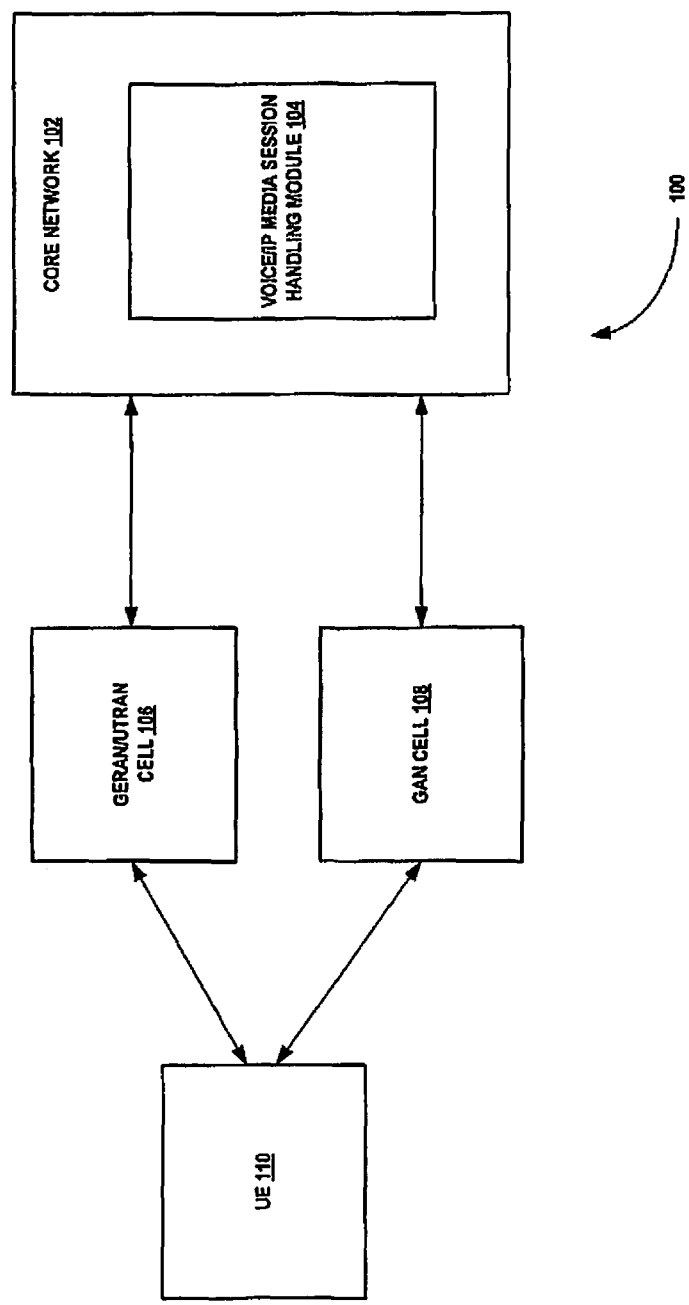
FIG. 1 is a block diagram illustrating a wireless communication system for managing voice call and IP media sessions, according to an embodiment of the present invention.

The drawings described herein are for illustration purposes only and are not intended to limit the scope of the present disclosure in any way.

DETAILED DESCRIPTION OF EMBODIMENTS OF THE PRESENT INVENTION

Embodiments of the present invention are described in detail hereinafter with reference to the accompanying drawings. In the following description, the same drawing reference numerals may be used for the same or similar elements even in different drawings. Additionally, a detailed description of known functions and configurations incorporated herein may be omitted when such a description may obscure the subject matter of the present invention.

FIG. 1 is a block diagram illustrating a wireless communication system for managing voice call and IP media sessions, according to an embodiment of the present invention.

Referring to FIG. 1, a wireless communication system 100 includes a core network 102, a GERAN/UTRAN cell 106 (also referred as first network cell) associated with a preferred RAT, a GAN cell 108 (also referred as second network cell) associated with a RAT of different type, and a UE 110.

The core network 102 serves the UE 110 via the GERAN/UTRAN cell 106 and/or the GAN cell 108. The GERAN/UTRAN cell 106 provides voice call and/or IP media service to the UE 110 when the UE 110 is attached to the GERAN/UTRAN cell 106. When the UE 110 is attached to the GAN cell 108, the GAN cell 108 provides data streams associated with the IP media service from the core network 102.

In the present example according to an embodiment of the present invention, the UE 110 is registered with the GERAN/UTRAN cell 106 and the GAN cell 108. A video call and IP media sessions are also ongoing on the UE 110 and the core network 102 over the GERAN/UTRAN cell 106. In such a case, the video/IP media session handling module 104 determines whether the UE 110 has selective IP media session offloading capabilities. According to an embodiment of the present invention, the UE 110 indicates its IP media session offloading capabilities to the core network 102 when registering for video call/IP media services with the core network 102.

If the UE 110 has offloading capabilities, the handling module 104 selects at least one of the IP media sessions or its portions for offloading to the GAN cell 108. The handling module 104 then routes data streams associated with the selected IP media session(s) via the GAN cell 108 while the remaining IP sessions and the voice call is provisioned over the GERAN/UTRAN cell 106. This routing helps mitigate data load on the GERAN/UTRAN cell 106. Certain embodiments of the present invention provide a mechanism for data splitting at an access mode level to maintain multiple streams, where policy to send different application data streams on different RATs is indicated to Logical Link Control (LLC) entity. The LLC entity then maps the data streams from a particular application to a particular LLC to access mode Service Access Point Identifier (SAPI). The policy information can then be passed to the LLC from Sub-Network Dependent Convergence Protocol (SNDCP) layer. A process of handling voice call/IP media session call according to an embodiment of the present invention is described in greater as follows with reference to FIG. 2.

Figure 2:
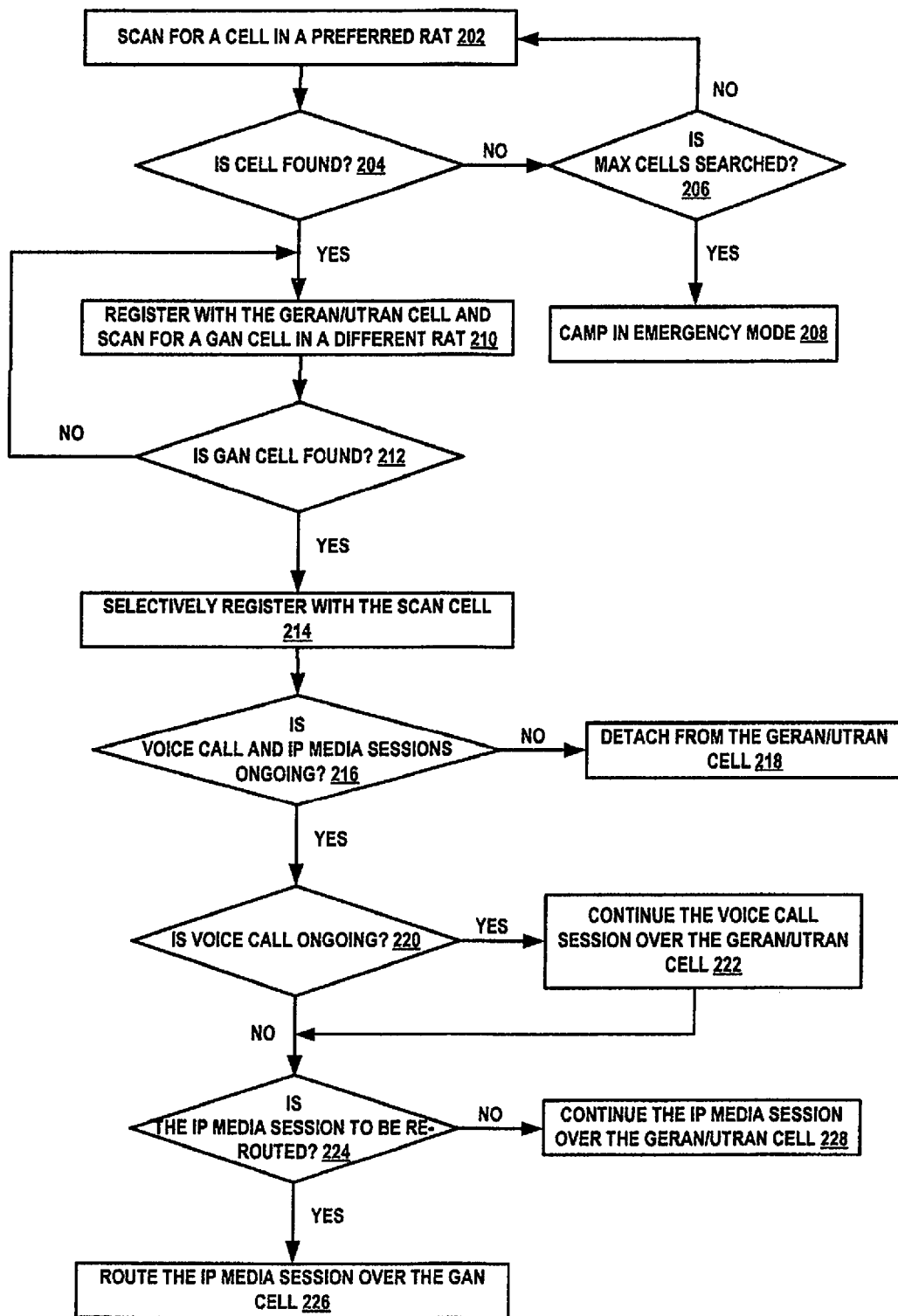
FIG. 2 is a process flowchart illustrating a method of managing video call and/or IP media sessions in a wireless communication environment, according to an embodiment of the present invention.

FIG. 2 is a process flowchart illustrating a method of managing video call and/or IP media sessions in a wireless communication environment, according to an embodiment of the present invention.

Referring to FIG. 2, in step 202, a cell is scanned in a preferred RAT, such as GERAN and UTRAN. At step 204, it is determined whether any cell is found in the preferred RAT during scanning. If no cell is found, then at step 206, it is determined whether a maximum number scans are performed. If the maximum number of scans is performed, then at step 208, any cell of a given RAT is used for camping in an emergency mode. Otherwise, steps 202 and 204 are repeated.

If, at step 204, it is determined that a cell is found, then at step 210, the UE 110 registers with the GERAN/UTRAN cell 106. Also, at step 210, the UE 110 scans for a GAN cell in another RAT. This scan is performed irrespective of whether the UE 110 has successfully registered with the GERAN/UTRAN cell 106. At step 212, it is determined any GAN cell is found in another RAT during the scanning operation. If any GAN cell is found, then at step 214, the UE 110 selectively registers with the GAN cell 108. Otherwise, step 210 is repeated. During this process, the UE 110 stays attached to the GERAN/UTRAN cell 106 and simultaneously latches onto the GAN cell 108.

At step 216, it is determined whether video call and at least one IP media session are simultaneously ongoing on the UE 110 over the GERAN/UTRAN cell 106. If the voice call and at least one IP media session are not ongoing simultaneously, then at step 218, the UE 110 detaches from the GERAN/UTRAN cell 106. If the voice call and at least one IP media session are ongoing simultaneously, then at step 220, it is determined whether a voice call is ongoing over the GERAN/UTRAN cell 106. If it is determined that the voice call is ongoing over the GERAN/UTRAN 106, then at step 222, the voice call is provisioned on the GERAN/UTRAN cell 106, and step 224 is performed.

At step 224, it is determined whether any of the IP media sessions to be offloaded on the GAN cell 108. If the IP media sessions to be offloaded on the GAN cell 108, then at step 226, data streams of the at least one IP media session are routed over the GAN cell 108. Otherwise, at step 228, the ongoing IP media sessions are provisioned over the GERAN/UTRAN cell 106. Thus, both the video call and IP media sessions are provisioned simultaneously over the GERAN/UTRAN cell 106 and the GAN cell 108, respectively, by selectively offloading at least one IP media session, or parts of at least one IP media session, to the GAN cell 108. To achieve this selective offloading, a Non-Access Stratum (NAS) entity must identify two active cells simultaneously in a GAN/GERAN/UTRAN network and maintain two active states of the GERAN/UTRAN cell and the GAN cell. This identification involves signaling (e.g., RAU, measurement reports, etc.) for GAN and GERAN in SAPI-1 and defining a new SAN, and thus maintaining simultaneous active states of the GERAN/UTRAN cell and the GAN cell.

In accordance with the above-described embodiments of the present invention, the core network 102 may send a paging message to the UE 110 over the GERAN/UTRAN cell 106 or the GAN cell 108. If the paging message is for a voice call connection, the GERAN/UTRAN cell 106 is used for provisioning the voice call connection. If the paging message is for an IP media session, then the UE 110 responds with the paging response based on the intimation by the core network 102. In both of the above cases, the core network 102 may choose to page the UE 110 in either of the cells 106 or 108 and specifies, in the page message, a cell through which the UE 110 shall respond to the page message.

When uplink data must be transferred, the UE remains latched onto the GERAN/UTRAN cell 106 and the GAN cell 108, and then offloads the entire IP media session or a portion of the IP media session to the GAN cell or continues with the transmission of data over the GERAN/UTRAN cell 106 based on order from the core network 102.

FIG. 3 is a flow diagram illustrating a method of indicating decision to selectively offload IP media session to a GAN cell, according to an embodiment of the present invention.

Referring to FIG. 3, at step 302, the UE 110 registers for video call/IP media services and also indicates selective IP media session offloading capabilities to the core network 102. At step 304, the core network 102 communicates configuration information associated with offloading IP media session(s) based on the selective IP media session offloading capabilities. At step 306, the UE 110 detects a GAN cell 108 and registers for IP media service only with the GAN cell 108 if the video call and IP media sessions are ongoing simultaneously via the GERAN/UTRAN cell 106.

At step 308, the UE 110, upon successful registration, indicates availability of the GAN cell 108 for offloading IP media session data streams to the core network 102. The IP media offloading decisions are conveyed between the core network 102 and the UE 110 and vice versa using a new NAS level signaling message. Accordingly, at step 310, the core network 102 initiates offloading of the IP media session (s) on to the GAN cell 108 from the GERAN/UTRAN cell 106. At step 312, the UE 110 initiates a transport control connection with the GAN cell 108. At step 314, the GAN cell acknowledges to the TC connection message. Finally, at step 316, the UE 110 initiates a data transfer associated with the IP media session(s) with the core network 102 via the GAN cell 108 (e.g., by sending Unlicensed Mobile Access (UMA) Radio Link Control (URLC) UNITDATA (URLC_UNITDATA)). This data transfer continues over the GAN cell 108 until the UE 110 terminates the session or the next session starts.

Various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium may be utilized in accordance with embodiments of the present invention. For example, the various electrical structure and methods may be embodied using transistors, logic gates, and electrical circuits, such as application specific integrated circuit may be utilized in accordance with embodiments of the present invention.

While the present invention has been shown and described with reference to certain embodiments thereof, it will be understood by those skilled in the art that various changes in form and details may be made therein without departing from the spirit and scope of the present invention as defined by the appended claims and their equivalents.

What is claimed is:

1. A method of a network entity of a first cell in a communication system, the method comprising:
    establishing a first connection with a user equipment (UE) using a first access technology;
    receiving, from the UE, via the first connection, capability information on communication with a second cell using a second access technology, wherein the second access technology is different from the first access technology;
    transmitting a first signal to the UE via the first connection; and
    transmitting, to the UE, via the first connection, configuration information related to the second cell,
    wherein the first signal is transmitted to the UE via the first connection while the UE receives a second signal, from the second cell, via a second connection between the UE and the second cell, and
    wherein the second connection is established between the UE and the second cell using the second access technology based on the configuration information.

2. The method of claim 1, wherein the capability information indicates that the UE supports an operation to receive signals from the first cell and the second cell.

3. A network entity of a first cell in a communication system, the network entity comprising:
    a memory; and
    at least one processor coupled to the memory,
    wherein the at least one processor is configured to:
        establish a first connection with a user equipment (UE) using a first access technology,
        receive, from the UE, via the first connection, capability information on communication with a second cell using a second access technology, wherein the second access technology is different from the first access technology,
        transmit, to the UE, via the first connection, a first signal, and
        transmit, to the UE, via the first connection, configuration information related to the second cell,
    wherein the first signal is transmitted to the UE via the first connection while the UE receives a second signal, from the second cell, via a second connection, between the UE and the second cell, and
    wherein the second connection is established between the UE and the second cell using the second access technology based on the configuration information.

4. The network entity of claim 3, wherein the capability information indicates that the UE supports an operation to receive signals from the first cell and the second cell.

5. The network entity of claim 3, wherein the first cell and the second cell are active for the UE.

6. A method of a user equipment (UE) in a communication system,
    the method comprising:
    establishing a first connection with a first cell using a first access technology;
    transmitting, to the first cell, via the first connection, capability information on communication with a second cell using a second access technology, wherein the second access technology is different from the first access technology;
    receiving a first signal from the first cell via the first connection;
    receiving configuration information related to the second cell from the first cell via the first connection;
    establishing a second connection with the second cell using the second access technology based on the configuration information; and
    receiving a second signal, from the second cell, via the second connection, while the first signal is received from the first cell.

7. The method of claim 6, wherein the capability information indicates that the UE supports an operation to receive signals from the first cell and the second cell.

8. The method of claim 6, wherein the first cell and the second cell are active for the UE.

9. A user equipment (UE) in a communication system, the UE comprising:
    a memory; and
    at least one processor coupled to the memory,
    wherein the at least one processor is configured to:
        establish a first connection with a first cell using a first access technology,
        transmit, to the first cell, via the first connection, capability information on communication with a second cell using a second access technology, wherein the second access technology is different from the first access technology,
        receive a first signal from the first cell via the first connection, receive configuration information related to the second cell from the first cell via the first connection, establish a second connection with the second cell using the second access technology based on the configuration information, and receive a second signal, from the second cell, via the second connection, while the first signal is received from the first cell.

10. The UE of claim 9, wherein the capability information indicates that the UE supports an operation to receive signals from the first cell and the second cell.

11. The UE of claim 9, wherein the first cell and the second cell are active for the UE.

12. The method of claim 1, wherein the first cell and the second cell are active for the UE.

* * * * *